(12) United States Patent
Hao et al.

(10) Patent No.: US 11,588,317 B2
(45) Date of Patent: Feb. 21, 2023

(54) GROUND FAULT CIRCUIT INTERRUPTER WITH LEAKAGE PROTECTION MODULE AND SELF-TEST MODULE

(71) Applicant: Shanghai Fudan Microelectronics Group Company Limited, Shanghai (CN)

(72) Inventors: Shusen Hao, Shanghai (CN); Yang Liu, Shanghai (CN); Chunyong Wu, Shanghai (CN); Jiwen Gong, Shanghai (CN)

(73) Assignee: Shanghai Fudan Microelectronics Group Company Limited, Shanghai (CN)

( * ) Notice: Subject to any disclaimer, the term of this patent is extended or adjusted under 35 U.S.C. 154(b) by 44 days.

(21) Appl. No.: 17/122,642

(22) Filed: Dec. 15, 2020

(65) Prior Publication Data

US 2022/0014010 A1 Jan. 13, 2022

(30) Foreign Application Priority Data

Jul. 9, 2020 (CN) .......................... 202010659034.7

(51) Int. Cl.
*H02H 3/16* (2006.01)
*H02H 1/00* (2006.01)
*H02H 3/05* (2006.01)

(52) U.S. Cl.
CPC ............ *H02H 3/16* (2013.01); *H02H 1/0007* (2013.01); *H02H 3/05* (2013.01)

(58) Field of Classification Search
CPC .......... H02H 1/0007; H02H 3/16; H02H 3/05; H02H 3/335; H02H 3/162; H02H 3/044; G01R 31/2827
See application file for complete search history.

(56) References Cited

U.S. PATENT DOCUMENTS

2005/0243484 A1* 11/2005 Kim ....................... H02H 3/335
361/42
2017/0222424 A1* 8/2017 Fukuo ..................... H02H 3/044
(Continued)

FOREIGN PATENT DOCUMENTS

CN 201489074 U 5/2010
CN 207339235 U * 5/2018
(Continued)

OTHER PUBLICATIONS

First Chinese Office Action regarding Application No. 202010659034.7 dated Dec. 20, 2021. English translation provided Unitalen Attorneys at Law.

*Primary Examiner* — Jared Fureman
*Assistant Examiner* — Nicolas Bellido
(74) *Attorney, Agent, or Firm* — Harness, Dickey & Pierce, P.L.C.

(57) ABSTRACT

A ground fault circuit interrupter is provided, including a sensor module, a leakage protection module, a self-test module and a tripping module. The sensor module is configured to generate a sensor current according to a detection signal. The leakage protection module is configured to: generate a trip driving signal in a detection stage according to the sensor current; and generate a trip driving signal in a non-detection stage after the self-test module has a fault. The self-test module is configured to generate the detection signal in the detection stage, and determine that the leakage protection module does not have a fault if the leakage protection module generates the trip driving signal. The tripping module is configured to respond to the trip driving signal generated in the non-detection stage to disconnect a load from a power supply circuit, and not respond to the trip driving signal generated in the detection stage.

13 Claims, 5 Drawing Sheets

(56) References Cited

U.S. PATENT DOCUMENTS

| | | | | |
|---|---|---|---|---|
| 2020/0350757 A1* | 11/2020 | Wu | ................... | H02H 1/0007 |
| 2020/0350758 A1* | 11/2020 | Wu | ................... | G01R 31/52 |
| 2021/0265832 A1* | 8/2021 | Li | ................... | H02H 3/335 |

FOREIGN PATENT DOCUMENTS

| | | | | |
|---|---|---|---|---|
| CN | 108879596 A | * | 11/2018 | ............ H02H 3/04 |
| CN | 109755921 A | | 5/2019 | |

* cited by examiner

GROUND FAULT CIRCUIT INTERRUPTER WITH LEAKAGE PROTECTION MODULE AND SELF-TEST MODULE

CROSS-REFERENCE TO RELATED APPLICATIONS

This application claims the benefit of priority to Chinese Patent Application No. 202010659034.7, filed on Jul. 9, 2020, and entitled "GROUND FAULT CIRCUIT INTERRUPTER", the entire disclosure of which is incorporated herein by reference.

TECHNICAL FIELD

The present disclosure generally relates to electronic technology field, and more particularly, to a ground fault circuit interrupter.

BACKGROUND

In a power supply system, to avoid safety issues such as electrocution caused by aging of lines, fault and the like at a load, a residual current interrupter with a leakage protection function is usually provided at a node which is connected with the load. The residual current interrupter detects a residual current. If the residual current is greater than a predetermined threshold, the residual current interrupter makes its internal mechanical device be tripped, and disconnects a power supply of the load, so as to protect a person and equipment.

However, a more reliable protection method is using a Ground Fault Circuit Interrupter (GFCI). Such interrupter cannot only detect hot-to-ground leakage faults, but also detect grounded neutral faults.

To verify an operation status of the GFCI, a test button is generally provided on the GFCI. The test button is periodically pressed to detect whether the GFCI can normally operate.

However, the existing solutions can merely detect whether a leakage protection circuit operates normally, but an operation status of a self-test circuit cannot be detected. That is, a fault of the self-test circuit cannot be detected by the existing solutions. In this case, the leakage protection function cannot be monitored well, and thus a fault of the leakage protection circuit cannot be timely detected, thereby causing a security risk.

SUMMARY

Embodiments of the present disclosure realize automatic detection of a GFCI.

In an embodiment, a GFCI is provided, including a sensor module, a leakage protection module, a self-test module and a tripping module, wherein the sensor module is configured to generate a sensor current according to a detection signal; the leakage protection module is configured to: generate a trip driving signal according to the sensor current in a detection stage; or generate a trip driving signal if the self-test module has a fault in a non-detection stage; the self-test module is configured to generate the detection signal in the detection stage, and determine that the leakage protection module does not have a fault if the trip driving signal is generated by the leakage protection module; and the tripping module is configured to respond to the trip driving signal generated in the non-detection stage to disconnect a load from a power supply circuit, and not respond to the trip driving signal generated in the detection stage.

In embodiments of the present disclosure, the GFCI not only provides fault detection of the leakage protection module, but also provides fault detection of the self-test module, which enhances detection functions of the GFCI and significantly improves safety.

DETAILED DESCRIPTION

In order to clarify the object, solutions and advantages of embodiments of the present disclosure, embodiments of present disclosure will be described explicitly in detail in conjunction with accompanying drawings.

Figure 1:
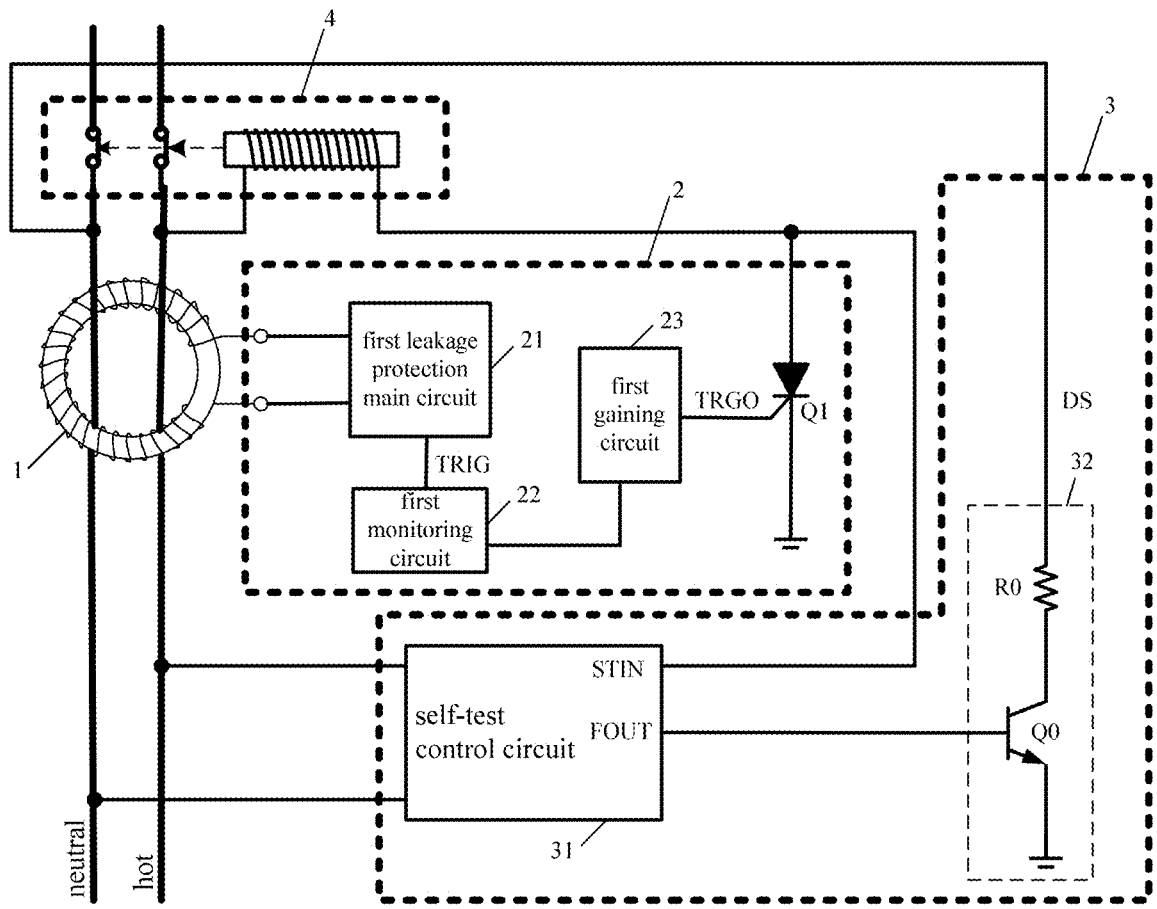
FIG. 1 schematically illustrates a structural diagram of a GFCI according to an embodiment.

Referring to FIG. 1, in an embodiment, a GFCI is provided, including a sensor module 1, a leakage protection module 2, a self-test module 3 and a tripping module 4.

The sensor module 1 is configured to generate a sensor current according to a detection signal DS.

The leakage protection module 2 is configured to: generate a trip driving signal TRGO according to the sensor current in a detection stage; or generate a trip driving signal TRGO if the self-test module 3 has a fault in a non-detection stage.

The self-test module 3 is configured to generate the detection signal DS in the detection stage, and determine that the leakage protection module 2 does not have a fault if the trip driving signal TRGO is generated by the leakage protection module 2.

The tripping module 4 is configured to respond to the trip driving signal TRGO generated in the non-detection stage to disconnect a load from a power supply circuit, and not respond to the trip driving signal TRGO generated in the detection stage.

Components of the GFCI are further described in detail below.

The sensor module 1 includes a zero sequence current transformer. The power supply circuit provides an Alternating Current (AC) signal, and may include a hot and a neutral which pass through the zero sequence current transformer. In some embodiments, the detection stage may correspond to a negative half cycle of the AC signal, and the non-detection stage may correspond to a positive half cycle of the AC signal.

The self-test module 3 periodically generates the detection signal DS in the detection stage, and the detection signal DS may be a simulated leakage current. Specifically, the self-test module 3 may generate a simulated leakage current through a simulated leakage current loop, and detect a response of the leakage protection module 2 to the simulated leakage current, that is, the detection signal DS is used for detecting whether the leakage protection module 2 has a fault.

The sensor module 1 senses the detection signal DS, and outputs the sensor current to the leakage protection module 2. When the sensor current reaches a preset leakage current operation threshold, the leakage protection module 2 generates the trip driving signal TRGO. If the self-test module 3 learns that the leakage protection module 2 generates the trip driving signal TRGO, it is determined that the leakage protection module 2 does not have a fault. If the leakage protection module 2 has a fault, for example, a power supply of a leakage protection control circuit is open, the self-test module 3 realizes that the leakage protection module 2 cannot generate the trip driving signal TRGO, so that it is determined that the leakage protection module 2 has a fault. A way of realizing that the leakage protection module 2 generates the trip driving signal TRGO is described in detail below.

The GFCI not only learns whether the leakage protection module 2 has a fault, but also monitors whether the self-test module 3 has a fault. Specifically, the leakage protection module 2 may determine that the self-test module 3 has a fault if the self-test module 3 does not generate the detection signal DS. If no detection signal DS is generated by the self-test module 3, the leakage protection module 2 cannot generate the trip driving signal TRGO in the detection stage. Therefore, whether the self-test module 3 has a fault may be determined based on whether the trip driving signal TRGO is generated in the detection stage.

From above, when learning that the leakage protection module 2 generates the trip driving signal TRGO in the detection stage, the self-test module 3 determines that the leakage protection module 2 does not have a fault. During the detection stage, the tripping module 4 does not respond to the disconnection control signal. Therefore, even if the leakage protection module 2 outputs the disconnection control signal according to the detection signal DS, the tripping module 4 may not disconnect the hot and the neutral from the load. After the leakage protection module 2 determines that the self-test module 3 has a fault, or a real leakage current occurs in the power supply circuit, the trip driving signal TRGO may be generated in the non-detection stage, and the tripping module 4 may respond to the trip driving signal TRGO generated in the non-detection stage, so as to disconnect the hot and the neutral from the load.

In this way, a false tripping during the detection stage may be avoided, and the hot and the neutral are disconnected from the load when the leakage protection module 2 or the self-detection module 3 has a fault. Further, a fault alarm may be generated by an alarming system.

Still referring to FIG. 1, the leakage protection module 2 includes a first leakage protection main circuit 21, a first monitoring circuit 22, a first gaining circuit 23 and a first silicon controlled rectifier Q1.

The first leakage protection main circuit 21 is configured to output a disconnection control signal TRIG according to the sensor current in the detection stage. The first monitoring circuit 22 is configured to output a disconnection control signal in the non-detection stage if the disconnection control signal TRIG is not detected. The first gaining circuit 23 is configured to increase driving capability of the disconnection control signal TRIG to generate the trip driving signal TRGO. A gate of the first silicon controlled rectifier Q1 is configured to receive the trip driving signal TRGO.

The first leakage protection main circuit 21, the first monitoring circuit 22 and the first gaining circuit 23 may share a same power supply, and may be integrated on one Integrated Circuit (IC) chip.

The self-test module 3 includes a self-test control circuit 31 and a simulated leakage current circuit 32.

The self-test control circuit 31 is configured to generate a simulated detection signal in the detection stage and output it via an output terminal FOUT, and determine that the leakage protection module 2 does not have a fault if it is detected that the first silicon controlled rectifier Q1 is triggered. The simulated leakage current circuit 32 is configured to generate the detection signal DS based on the simulated detection signal. The first leakage protection main circuit 21 and the self-test control circuit 31 may be integrated on one IC chip. A gate of the first silicon controlled rectifier Q1 receives the trip driving signal TRGO, a cathode of the first silicon controlled rectifier Q1 is grounded, and an anode of the first silicon controlled rectifier Q1 is coupled with the tripping module 4 and the first leakage protection main circuit 21.

The simulated leakage current circuit 32 includes a first triode Q0 and a first resistor R0.

A base of the first triode Q0 is configured to receive the simulated detection signal, a collector of the first triode Q0 is coupled to a first terminal of the first resistor, and an emitter of the first triode Q0 is grounded. A second terminal of the first resistor R0 is configured to output the detection signal DS.

Figure 2:
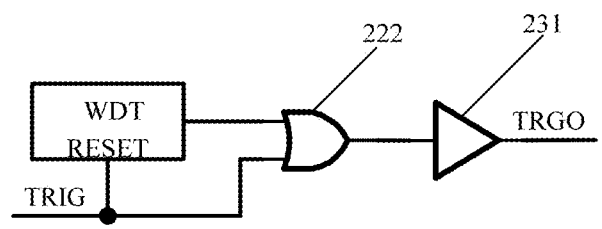
FIG. 2 schematically illustrates a structural diagram of a first monitoring circuit according to an embodiment.

Referring to FIG. 2, the first monitoring circuit 22 includes a watchdog circuit WDT and a first logic OR gate 222, and the first gaining circuit 23 includes a buffer 231.

A reset input terminal RESET of the watchdog circuit WDT is coupled to an output terminal of the first leakage protection main circuit 21, and an output terminal of the watchdog circuit WDT is coupled to a first input terminal of the first logic OR gate 222. A second input terminal of the first logic OR gate 222 is coupled to the output terminal of the first leakage protection main circuit 21, and an output terminal of the first logic OR gate 222 is coupled to an input terminal of the buffer 231. An output terminal of the buffer 231 is configured to output the trip driving signal TRGO.

Figure 3:
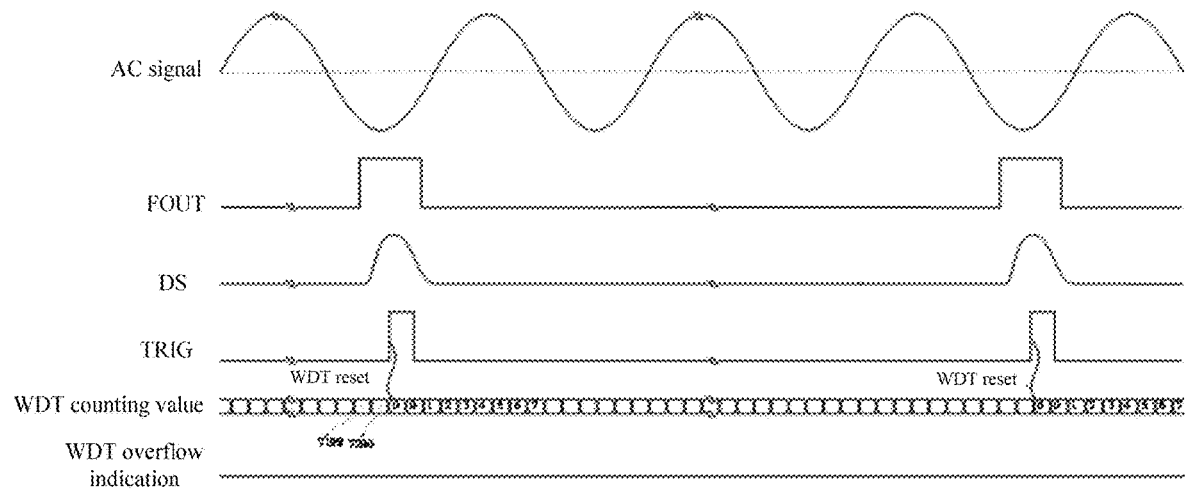
FIG. 3 schematically illustrates waveforms associated with a GFCI during normal operation according to an embodiment.
Figure 4:
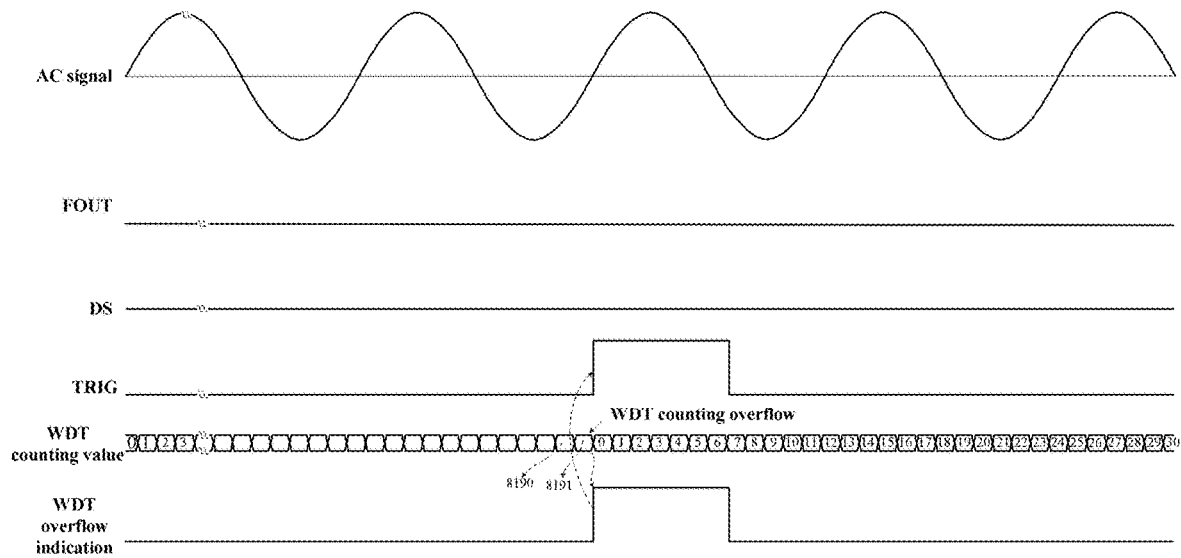
FIG. 4 schematically illustrates waveforms associated with a self-test control circuit in a GFCI when its power supply is open according to an embodiment.

Referring to FIGS. 3 and 4, the watchdog circuit WDT includes a clock counter and a reset input terminal RESET. The clock counter is used for timing, and its reset input terminal RESET is configured to receive a reset signal to reset the clock counter. If no valid reset signal is received within a preset counting time, the watchdog circuit WDT outputs a pulse signal of count overflow after the preset counting time expires. If a valid reset signal is received within the preset counting time, the watchdog circuit WDT clears the clock counter and restarts timing.

The reset input terminal RESET of the watchdog circuit WDT is coupled to the output terminal of the first leakage protection main circuit 21. During the counting time of the clock counter of the watchdog circuit WDT, if the first leakage protection main circuit 21 outputs the disconnection control signal TRIG; the watchdog circuit WDT is reset, and its internal clock counter restarts timing, so that the watchdog circuit WDT may not output a pulse signal due to timing overflow. The disconnection control signal TRIG output by the first leakage protection main circuit 21 and the output signal of the watchdog circuit WDT are provided to input terminals of the first logic OR gate 222, and an output of the first logic OR gate 222 is output after being strengthened by the buffer 231.

In normal operation, the self-test module 3 periodically sends out the detection signal DS, and accordingly the first leakage protection main circuit 21 periodically outputs the disconnection control signal TRIG which periodically resets the watchdog circuit WDT, so that the clock counter of the watchdog circuit WDT does not overflow, and the watchdog circuit WDT circuit does not output pulse signals. Besides, the disconnection control signal TRIG is output to the gate of the first silicon controlled rectifier Q1 via the first logic OR gate 222 and the buffer 231, to trigger the first silicon controlled rectifier Q1. An anode of the triggered first silicon controlled rectifier Q1 becomes a low level. When it is detected that an anode voltage of the first silicon controlled rectifier Q1 is a low level in the detection stage, it is determined that the leakage protection module 2 generates the trip driving signal TRGO in the detection stage, that is, the leakage protection module 2 does not have a fault.

If a power supply pin of the self-test control circuit 31 is open, the self-test control circuit 31 no longer generates a simulated detection signal, the watchdog circuit WDT may no longer be reset periodically, and the clock counter of the watchdog circuit WDT overflows. A pulse signal for timing overflow is output in a positive half cycle of an AC signal, and reaches the gate of the first silicon controlled rectifier Q1 via the first logic OR gate 222 and the buffer 231, so that the first silicon controlled rectifier Q1 is triggered, and the anode of the first silicon controlled rectifier Q1 becomes a low level.

When the anode voltage of the first silicon controlled rectifier Q1 is detected to be low in the non-detection stage, it is determined that the leakage protection module 2 generates the trip driving signal TRGO in the non-detection stage, that is, the self-test module 3 has a fault, or a real residual current fault has occurred in a power supply loop, where the power supply loop includes the hot and the neutral and the load connected between the hot and the neutral. At this time, when the first silicon controlled rectifier Q1 is triggered in the positive half cycle of the AC signal, a current is generated in the tripping module 4 to trigger an operation of a mechanical structure, thereby disconnecting the load from the power supply circuit.

For example, the watchdog circuit WDT starts counting from 0. After about 6 minutes, when the watchdog circuit WDT counter counts to 7200, the output terminal FOUT outputs a high-level pulse, and the simulated leakage current circuit 32 generates the detection signal DS. After detecting the detection signal DS, the first leakage protection main circuit 21 outputs the disconnection control signal TRIG with high-level pulse which resets a counting value of the watchdog circuit WDT to 0. After the disconnection control signal TRIG becomes a low level, the counter of the watchdog circuit WDT restarts counting from 0.

After the power supply pin of the self-test control circuit 31 is open, the watchdog circuit WDT starts counting from 0. As the power supply of the self-test control circuit 31 is open, a high-level pulse signal at FOUT can no longer be generated. The simulated leakage current circuit 32 cannot generate the detection signal DS to detect whether a leakage protection function of the leakage protection module 2 is normal. Until about 6.8 minutes later, the counter of the watchdog circuit WDT overflows when it counts to 8191, and a high-level pulse signal is output. The high-level pulse signal is output via the first logic OR gate 222 and the buffer 231 to trigger the tripping module 4 to disconnect the load from the power supply circuit.

Figure 5:
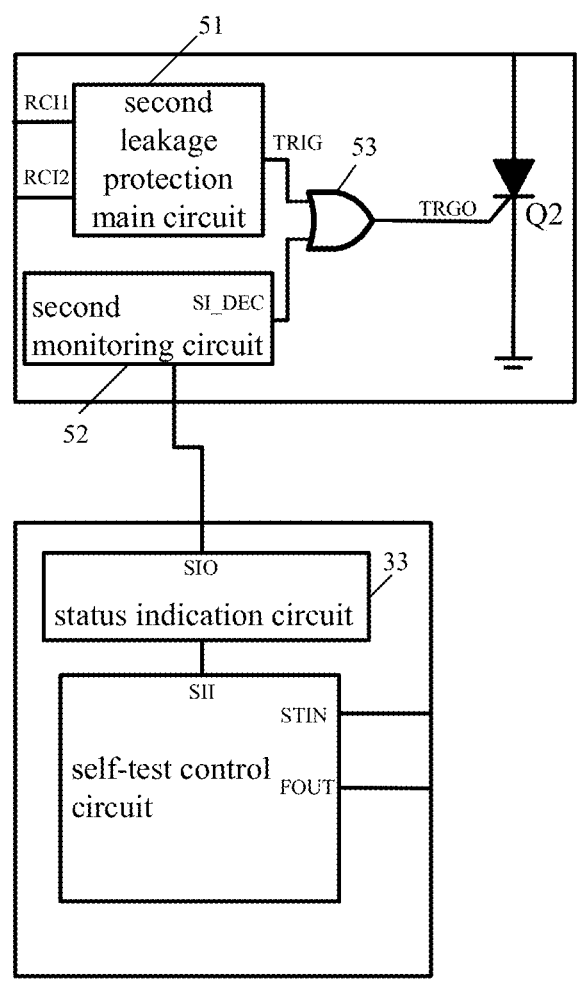
FIG. 5 schematically illustrates a structural diagram of a leakage protection module and a self-test module according to an embodiment.

Referring to FIG. 5, another way of generating a trip driving signal TRGO by the leakage protection module is provided. In this case, the self-test module further includes a status indication circuit 33. The leakage protection module may include a second leakage protection main circuit 51, a second monitoring circuit 52, a second gaining circuit 53 and a second silicon controlled rectifier Q2.

The status indication circuit 33 is configured to output an indication signal indicating an operation status of the self-test module, wherein the indication signal includes an indication signal indicating that the self-test module does not have a fault.

The second leakage protection main circuit 51 is configured to output a disconnection control signal TRIG according to the sensor current in the detection stage. The second monitoring circuit 52 is configured to generate a disconnection control signal, if receiving the indication signal indicating that the self-test module does not have a fault or if no indication signal is received within a predetermined time. The indication signal may be a level signal, or a pulse sequence with a certain coding form. The second gaining circuit 53 is configured to increase driving capability of the disconnection control signal TRIG to generate the trip driving signal TRGO. A gate of the second silicon controlled rectifier Q2 is configured to receive the trip driving signal TRGO.

The second leakage protection main circuit 51 and the second monitoring circuit 52 may share a same power supply. The second leakage protection main circuit 51, the second monitoring circuit 52 and the second gaining circuit 53 may be integrated on one IC chip. Similarities between the embodiment as shown in FIG. 5 and the above embodiments as shown in FIGS. 1 to 4 are not described in detail here.

Figure 6:
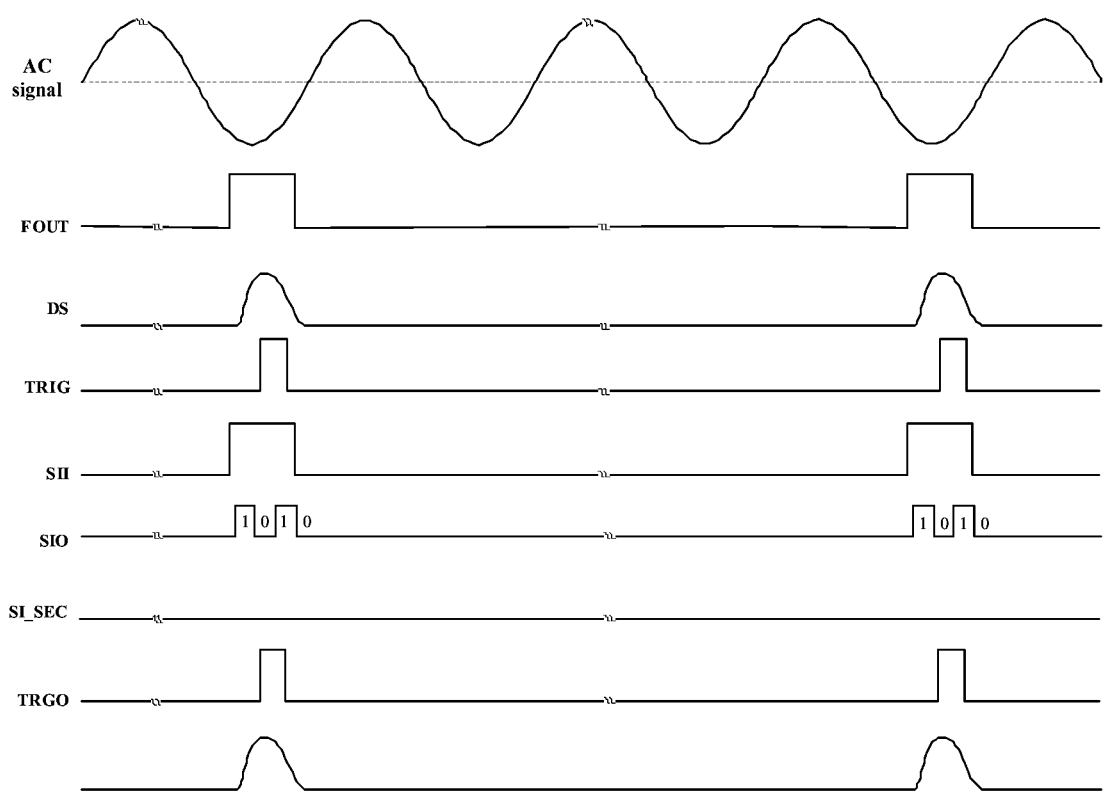
FIG. 6 schematically illustrates waveforms associated with a GFCI during normal operation according to an embodiment.

As shown in FIG. 6, in the detection stage, the output terminal FOUT of the self-test control circuit outputs a high-level pulse, and accordingly a detection signal DS is generated. The second leakage protection main circuit 51 generates a disconnection control signal TRIG which is a high-level pulse signal according to the detection signal DS. When the high-level pulse signal is output from the output terminal FOUT of the self-test control circuit, the same signal is output from an output terminal SII of the self-test control circuit to the status indication circuit 33. The status indication circuit 33 outputs an indication signal coded as "1010" to the second monitoring circuit 52 to indicate that the self-test module does not have a fault. After the second monitoring circuit 52 receiving the indication signal coded as "1010", an output terminal SI_DEC of the second monitoring circuit 52 remains a low level.

Figure 7:
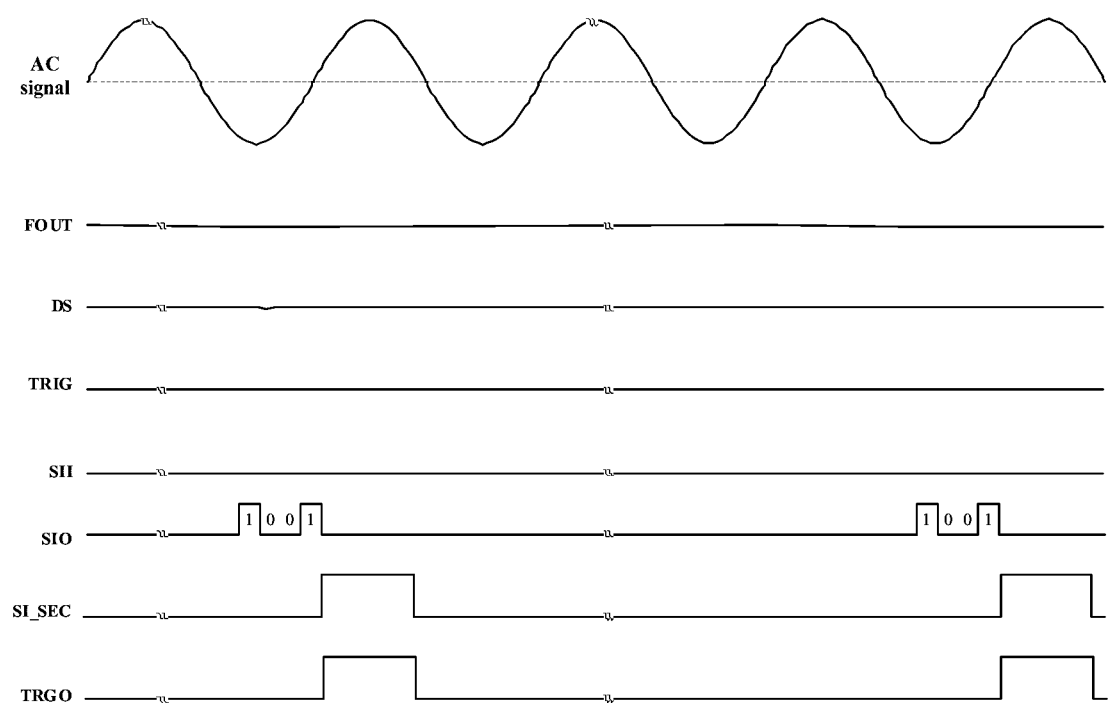
FIG. 7 schematically illustrates waveforms associated with a self-test control circuit in a GFCI when its power supply is open according to an embodiment.

As shown in FIG. 7, when the self-test module has a fault, if a correct phase signal is not detected at its STIN terminal, the output terminals FOUT and SII no longer output high-level pulse signals. If not receiving the high-level pulse from the output terminal SII within a time period, such as 6.8 minutes, the status indication circuit 33 sends an indication signal coded as "1001" from its output terminal SIO to the second monitoring circuit 52. After receiving the indication signal coded as "1001", the second monitoring circuit 52 determines that the self-test module has a fault, and outputs a disconnection control signal TRIG which is a high-level pulse signal via its output terminal SI_DEC. Accordingly, the trip driving signal TRGO is also a high-level pulse signal, which drives the tripping module 4 to trip.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A ground fault circuit interrupter, comprising a sensor module, a leakage protection module, a self-test module and a tripping module,
wherein the sensor module is configured to generate a sensor current according to a detection signal;
the leakage protection module is configured to: generate a trip driving signal according to the sensor current in a detection stage; and generate the trip driving signal when the self-test module has a fault in a non-detection stage;
the self-test module is configured to generate the detection signal in the detection stage, and determine that the leakage protection module does not have a fault when the trip driving signal is generated by the leakage protection module; and
the tripping module is configured to respond to the trip driving signal generated in the non-detection stage to disconnect a load from a power supply circuit, and not respond to the trip driving signal generated in the detection stage.

2. The ground fault circuit interrupter according to claim 1, wherein the sensor module comprises a zero sequence current transformer, and the power supply circuit comprises a hot and a neutral which pass through the zero sequence current transformer.

3. The ground fault circuit interrupter according to claim 1, wherein the leakage protection module comprises:
a first leakage protection main circuit configured to output a disconnection control signal according to the sensor current in the detection stage;
a first monitoring circuit configured to output a disconnection control signal in the non-detection stage when the disconnection control signal is not detected;
a first gaining circuit configured to increase driving capability of the disconnection control signal to generate the trip driving signal; and
a first silicon controlled rectifier having a gate configured to receive the trip driving signal.

4. The ground fault circuit interrupter according to claim 3, wherein the first monitoring circuit comprises a watchdog circuit and a first logic OR gate, and the first gaining circuit comprises a buffer,
wherein a reset input terminal of the watchdog circuit is coupled to an output terminal of the first leakage protection main circuit, and an output terminal of the watchdog circuit is coupled to a first input terminal of the first logic OR gate;
a second input terminal of the first logic OR gate is coupled to the output terminal of the first leakage protection main circuit, and an output terminal of the first logic OR gate is coupled to an input terminal of the buffer; and
an output terminal of the buffer is configured to output the trip driving signal.

5. The ground fault circuit interrupter according to claim 3, wherein the self-test module comprises:
a self-test control circuit configured to generate a simulated detection signal in the detection stage, and determine that the leakage protection module does not have a fault when it is detected that the first silicon controlled rectifier is triggered; and
a simulated leakage current circuit configured to generate the detection signal based on the simulated detection signal.

6. The ground fault circuit interrupter according to claim 5, wherein the simulated leakage current circuit comprises a first triode and a first resistor,
wherein a base of the first triode is configured to receive the simulated detection signal, a collector of the first triode is coupled to a first terminal of the first resistor, and an emitter of the first triode is grounded; and
a second terminal of the first resistor is configured to output the detection signal.

7. The ground fault circuit interrupter according to claim 1, wherein the self-test module comprises:
a self-test control circuit configured to generate a simulated detection signal in the detection stage, and determine that the leakage protection module does not have a fault when the trip driving signal is output by the leakage protection module in the detection stage;
a simulated leakage current circuit configured to generate the detection signal based on the simulated detection signal; and
a status indication circuit configured to output an indication signal indicating an operation status of the self-test module, wherein the indication signal comprises an indication signal indicating that the self-test module does not have a fault.

8. The ground fault circuit interrupter according to claim 7, wherein the leakage protection module comprises:
a second leakage protection main circuit configured to output a disconnection control signal according to the sensor current in the detection stage;
a second monitoring circuit configured to output a disconnection control signal, when receiving the indication signal indicating that the self-test module does not have a fault or when no indication signal is received within a predetermined time;
a second gaining circuit configured to increase driving capability of the disconnection control signal to generate the trip driving signal; and
a second silicon controlled rectifier having a gate configured to receive the trip driving signal.

9. The ground fault circuit interrupter according to claim 8, wherein the self-test control circuit is configured to determine that the leakage protection module does not have a fault when it is detected that the second silicon controlled rectifier is triggered.

10. The ground fault circuit interrupter according to claim 7, wherein the simulated leakage current circuit comprises a first triode and a first resistor,
wherein a base of the first triode is configured to receive the simulated detection signal, a collector of the first triode is coupled to a first terminal of the first resistor, and an emitter of the first triode is grounded; and
a second terminal of the first resistor is configured to output the detection signal.

11. The ground fault circuit interrupter according to claim 1, wherein the self-test module further comprises an alarming module, configured to generate an alarm when the leakage protection module does not generate the trip driving signal, or when the self-test module does not generate the detection signal.

12. The ground fault circuit interrupter according to claim 1, wherein the leakage protection module is configured to determine that the self-test module has a fault when the self-test module does not generate the detection signal.

13. The ground fault circuit interrupter according to claim 1, wherein the self-test module is configured to periodically generate the detection signal.

* * * * *